United States Patent
Fox et al.

(10) Patent No.: US 10,713,468 B2
(45) Date of Patent: Jul. 14, 2020

(54) CHECKING CREDENTIALS USING A DRONE

(71) Applicant: International Business Machines Corporation, Armonk, NY (US)

(72) Inventors: Jeremy R. Fox, Georgetown, TX (US); Gregory J. Boss, Saginaw, MI (US); Christian B. Compton, Austin, TX (US); Andrew R. Jones, Round Rock, TX (US); John E. Moore, Jr., Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/183,991

(22) Filed: Nov. 8, 2018

(65) Prior Publication Data

US 2020/0151423 A1     May 14, 2020

(51) Int. Cl.
    *G06K 9/00*     (2006.01)
    *B64C 39/02*     (2006.01)

(52) U.S. Cl.
    CPC ........ *G06K 9/00228* (2013.01); *B64C 39/024* (2013.01); *B64C 2201/127* (2013.01)

(58) Field of Classification Search
    None
    See application file for complete search history.

(56) References Cited

U.S. PATENT DOCUMENTS

| | | | |
|---|---|---|---|
| 4,398,257 A | 8/1983 | Paganini et al. | |
| 5,502,806 A | 3/1996 | Mahoney et al. | |
| 6,529,786 B1 | 3/2003 | Sim | |
| 9,292,705 B2 * | 3/2016 | Lemmey | G06F 21/6254 |
| 9,456,309 B2 | 9/2016 | Zises | |
| 9,479,467 B2 | 10/2016 | Barlow | |

(Continued)

FOREIGN PATENT DOCUMENTS

| | | |
|---|---|---|
| WO | 2010026521 A1 | 3/2010 |
| WO | 2012170958 A1 | 12/2012 |

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — K. Wong
(74) *Attorney, Agent, or Firm* — Michael A. Petrocelli (57) ABSTRACT

A method, system, and computer program product is disclosed for checking credentials, using a drone. The drone detects a line of people, and the drone can communicate with the base station. The drone can request information from a person on the line for checking credentials of the people in the line with respect to a purpose for forming the line. The method and system captures information about the person, in response to the drone requesting information from the person, and the person providing the requested information. The method and system checks the information with data stored at the base station to verify the person's information with respect to required credentials being related to the purpose of the line. A message is communicated, using the drone, to the person on the line, in response to the checking of the information of the person.

20 Claims, 8 Drawing Sheets

(56) References Cited

U.S. PATENT DOCUMENTS

| | | | |
|---|---|---|---|
| 9,494,936 B2* | 11/2016 | Kerzner | G05D 1/0022 |
| 9,704,311 B2* | 7/2017 | Ambrefe, Jr. | G07C 9/00158 |
| 9,940,525 B2* | 4/2018 | Wolf | G06K 9/00771 |
| 2004/0158482 A1 | 8/2004 | Hale et al. | |
| 2005/0065834 A1 | 3/2005 | Hale et al. | |
| 2011/0273312 A1 | 11/2011 | Eggleton et al. | |
| 2014/0132772 A1* | 5/2014 | Billau | G08B 13/19682 348/159 |
| 2014/0375800 A1* | 12/2014 | Lim | H04M 1/72538 348/143 |
| 2015/0186957 A1 | 7/2015 | Barr | |
| 2016/0012375 A1 | 1/2016 | Hanson et al. | |
| 2016/0021507 A1 | 1/2016 | Gaines | |
| 2016/0255475 A1 | 9/2016 | Maguire | |
| 2017/0054849 A1 | 2/2017 | Torre | |
| 2017/0337791 A1* | 11/2017 | Gordon-Carroll | G08B 13/19645 |
| 2017/0341746 A1 | 11/2017 | Erickson et al. | |

OTHER PUBLICATIONS

Mayhew, "Face-Six releases facial recognition software for drones", Biometric Update, Dec. 12, 2017, 6 pages, https://www.biometricupdate.com/201712/face-six-releases-facial-recognition-software-for-drones.

Brandom, "The US Border Patrol is trying to build face-reading drones", The Verge, Apr. 6, 2017, 5 pages, https://www.theverge.com/2017/4/6/15208820/customs-border-patrol-drone-facial-recognition-silicon-valley-dhs.

Crowdvision, "Solutions for Airports: Automated passenger tracking using video analytics", Accessed Mar. 9, 2018, 5 pages, https://www.crowdvision.com/solutions-airports/.

Denman et al., "Automatic surveillance in transportation hubs: No longer just about catching the bad guy", Expert Systems with Applications, vol. 42, (2015), pp. 9449-9467.

Hsu et al., "Face Recognition on Drones: Issues and Limitations", DroNet' 15, May 18, 2015, pp. 39-44.

Gethover, "Hover Camera Passport", Accessed on Apr. 23, 2018, 6 pages, https://gethover.com/hover-camera-passport?d=pc.

iHLS, "Airports in the US Purchase Queue Management Services", Nov. 13, 2016, 4 pages, https://i-hls.com/archives/72878.

Saeed et al., Argus: Realistic Target Coverage by Drones, The Proceedings of the 16th ACM/IEEE International Conference on Information Processing in Sensor Networks, Apr. 2017, pp. 155-166.

Pending U.S. Appl. No. 16/183,966, filed Nov. 8, 2018, entitled: "Indentifying the Purpose and Context of a Line of People", 54 pages.

IBM: List of IBM Patents or Patent Applications Treated as Related (Appendix P), Dec. 6, 2018, 2 pages.

Fox, et al. "Identifying Purpose and Context of a Line of People", U.S. Appl. No. 16/433,057, filed Jun. 6, 2019.

List of IBM Patents or Patent Applications Treated as Related, Filed Jun. 6, 2019, 2 pages.

* cited by examiner

CHECKING CREDENTIALS USING A DRONE

BACKGROUND

The present disclosure relates to a method and system for checking or verifying credentials, using a drone. Often people can be standing in a line or in a queue to enter a venue, or to speak to an administrator at a check-in point to enter a venue or facility. Such situations are common at, for example, an airport, where a line forms for security, or for checking baggage etc. Other venues can include sporting events, conferences, or any public event. Sometimes people can be standing in the wrong line for the service they are waiting for, and do not know they are in the wrong line. In busy public areas (e.g., airports, train stations, conferences, sporting event, public events, etc. . . . ) there can be many different lines within an area, or the lines can become intertwined and a person might unknowingly be in the wrong line. In these instances, a person can waste time, miss a time period to enter a venue (such as missing a flight at an airport), or other such disadvantageous events caused by, at least in part, waiting in an incorrect line. Further, a person may wait on a line, only to find out when they get to a check in point that they do not have the approved credential, or necessary information for entering the venue or proceeding to a next step of a process.

SUMMARY

The present disclosure provides a method and system to reduce the problem of a person waiting on a wrong line, or having the wrong credentials for the line, by using a drone to facilitate checking credentials of a person on the line. Thereby, reducing lost time for a person, increasing the persons efficiency, and enabling the line to move more efficiently.

In one aspect according to the invention, a method, using a drone, for checking credentials includes detecting a line of people and a beginning of the line using a drone. The drone has a base station and is in communication with the base station for checking credentials of the people in the line with respect to a purpose for forming the line. The method detects a person in the line of people, and captures information about the person in response to the drone requesting information from the person and the person providing the requested information. The method checks the information with data, at least in part, stored at the base station to verify the person's information with respect to credentials being related to the purpose of the line. Further, the method includes communicating a message to the person on the line, in response to the checking of the information of the person.

In another aspect according to the present invention, a system for checking credentials, using a drone includes, a computer system comprising: a computer processor, a computer-readable storage medium, and program instructions stored on the computer-readable storage medium being executable by the processor, to cause the computer system to: detect a line of people and a beginning of the line of people using a drone, the drone having a base station and being in communication with the base station for checking credentials of the people in the line with respect to a purpose for forming the line; detect, using the drone, a person in the line of people; capture information about the person using the drone, in response to the drone requesting information from the person and the person providing the requested information; check the information with data, at least in part, stored at the base station to verify the person's information with respect to required credentials being related to the purpose of the line; and communicate a message, using the drone, to the person on the line, in response to the checking of the information of the person.

In another aspect according to the present invention, a computer program product for checking credentials, using a drone, includes the computer program product comprising a computer readable storage medium having program instructions embodied therewith, wherein the computer readable storage medium is not a transitory signal per se. The program instructions executable by a computer to cause the computer to perform a method, comprising: detecting a line of people and a beginning of the line of people using a drone, the drone having a base station and being in communication with the base station for checking credentials of the people in the line with respect to a purpose for forming the line; detecting, using the drone, a person in the line of people; capturing information about the person using the drone, in response to the drone requesting information from the person and the person providing the requested information; checking the information with data, at least in part, stored at the base station to verify the person's information with respect to required credentials being related to the purpose of the line; and communicating a message, using the drone, to the person on the line, in response to the checking of the information of the person.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawing are discussed forthwith below.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Figure 1:
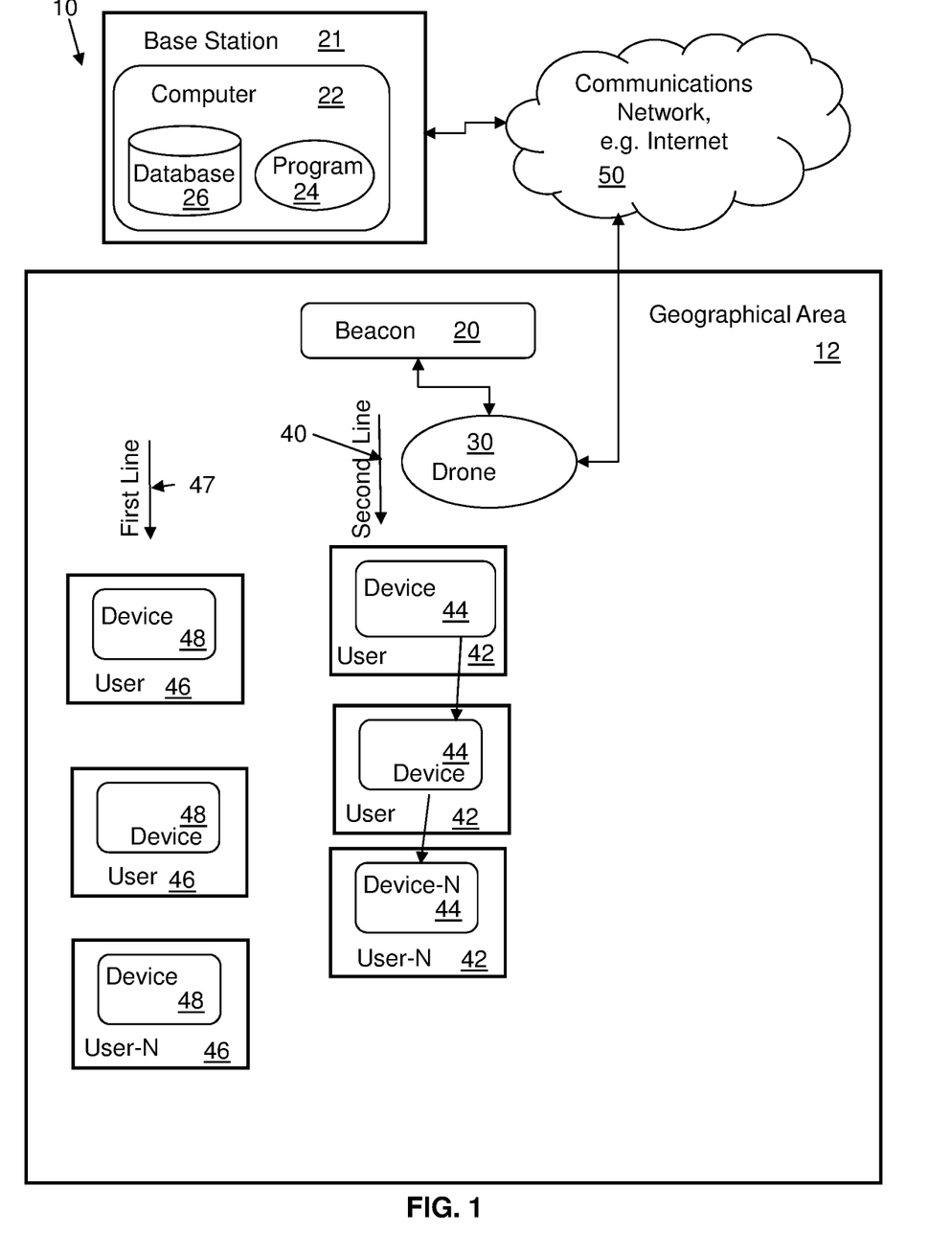
FIG. 1 is a schematic block diagram illustrating an overview of a system and methodology for checking credentials, using a drone, of a person in a line of people, according to an embodiment of the disclosure.
Figure 2:
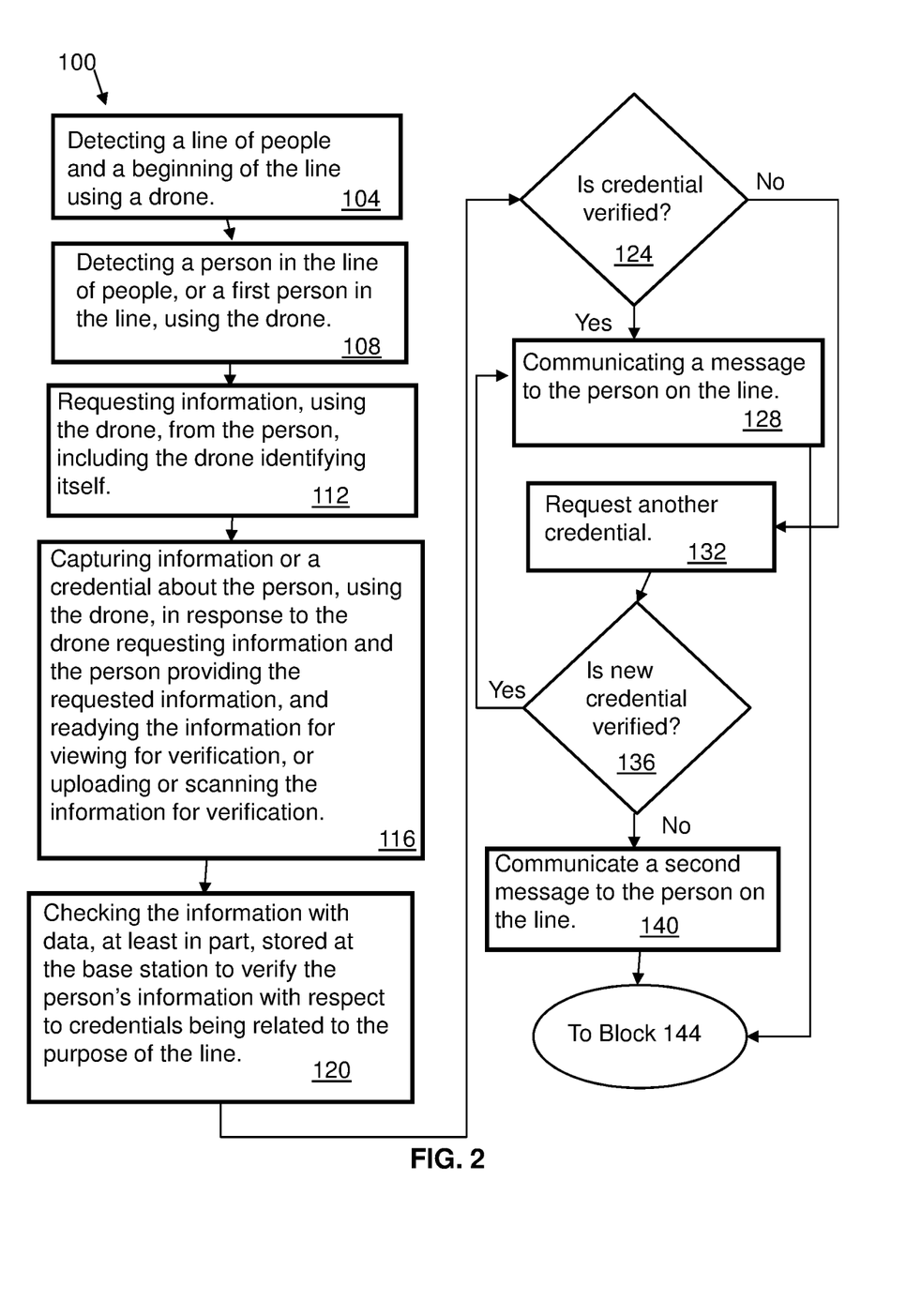
FIG. 2 is a flow chart illustrating a method, implemented using the system shown in FIG. 1, for checking credentials, using a drone, of a person in a line of people, according to an embodiment of the disclosure.

Referring to FIGS. 1 and 2, a method 100 (FIG. 2) with reference to a system 10 (FIG. 1) according to an embodiment of the present disclosure is provided for checking credentials of a person in a line of people, using a drone. The credential can be all or part of information about the person, which is required or suggested for verification for the person, or for the person to continue to a next point of verification, and the information, e.g., credential, is related to a purpose of the line (if the person is in the correct line). In one example a drone can engage persons in sequence in the line to check credentials (or perform a credential check) of all the people in the line. In another example, multiple drones can be used to check credentials of people in sections of the line or in a crowd of people. The credentials can include, but are not limited to, a driver's license, a ticket, a pass, or any other type or kind of information for proof of purchase, entry, exit, invitee list, etc. The above example credentials are samples of information about the person or persons in a line, such information can include identification or specified identification, requested by an administrator, or authority responsible for checking identification or screening people entering a venue. The credentials may be required for verification that the person is in the correct line, or for the person to move past a check point, or for entry into a venue or area. The check point may have a computer for the check-in process with an administrator or an authority facilitating the check-in process. The check point computer can be capable of receiving credentials and/or verification of the credentials from the drone, or the base station computer, or a combination of both, for advanced verification of the person in the line before the person reaches the check point computer.

Referring to FIG. 1, in one embodiment of the present disclosure, a beacon 20 is designed and configured to transmit a signal or message within a specified range of the beacon to indicate the beginning of a second line 40. The beacon can be placed at a known line starting point or beginning. A drone 30 communicates with the beacon to ascertain the beginning of the line and a purpose of the line. The beginning of the line can be indicated to the drone by the beacon transmitting a signal or message within a specified range of the beacon, thus the beacon transmits to a specified line, in this case, the second line 40 and its vicinity. The message (which can also be referred to as a transmitted or transmitting signal/message) can be a transmitted using a designated protocol such as a short distance communication (PAN). The transmitted message can be configured to communicate with any device, for example the drone 30, within the specified range of the transmission. The beacon 20 (along with other beacons (not shown)) can be located in a geographical area 12, for example, in an area where multiple lines are formed.

In one example, an end or finishing point of a line can be ascertained, for example, by capturing a short period of time of video and evaluating the movement of people. For example, if a person doesn't move but those nearby him are moving in a serialized fashion then the system can determine that the person not moving is not part of the line. Those that follow the same person for a period of time can be assumed to be in a line.

The purpose of the line can be related to, at least in part, the location of the line. For example, a lines location next to a beacon indicating the purpose of the line. Alternatively, a lines location at an entrance to a venue can indicate a purpose of the line as being for entering the venue.

People queued (users 42) in the second line may have devices 44. Additional users or persons in the line are depicted as users 42 and devices 44, for an N number of users and devices, the total number of users and devices in the line is denoted by device-N and user-N (FIG. 1).

People queued (users 46), in a first line 47 may communicate with another beacon (not shown) or another drone can communicate with a beacon associated with the first line 47. Alternatively, the drone 30 can receive instructions from another beacon for the first line 47, after completing a task regarding the second line 40, or when there are no more users 42, or the second line dissolves for any reason. Users 46 on the first line may have devices 48, respectively. Additional users or persons in the line are depicted as users 46 and devices 48, for an N number of users and devices, the total number of users and devices in the line is denoted by device-N and user-N (FIG. 1).

The beacon can also be referred to as an originating sensor, and for example, be embodied as a device, mobile device, computer, drone, or other unit configured and capable of providing the functionality of the beacon described herein.

Alternatively, or in combination with communicating with the beacon, according to an embodiment of the present disclosure, the drone 30 can communicate with a remote computer 22 at a base station 21 via a communications network 50, such as the Internet. The computer 22 can include a database 26 and a program 24. The computer 22 and program 24 can provide instructions to the drone along with data stored in the database 26.

In general, the drone can include a propulsion system and a power system such as rechargeable batteries, so that the drone can fly to a location, hover, and transmit data to the base station. The drone, according to embodiments of the present disclosure, can also communicate with a person or user 42 in the second line 40. Such communication can include, for example, but are not limited to, a simulated voice (or an audible message such as an audible simulated voice), as in car navigation, a text communicated to a device of the person, a displayed text message on a display of the drone (such as using an LED (light emitting diode), which can scroll a message), or an open communication line to an actual person/customer service representative. In another example, the drone can play a voice recording or digital voice which requests a credential.

Referring to FIG. 2, with reference to the system 10 shown in FIG. 1, a method 100, according to an embodiment of the present disclosure, includes using a drone for checking credentials of a person in a line or people. Referring to block 104, the method includes detecting a line of people, the second line 40 as shown in FIG. 1, and a beginning of the line using the drone 30. As discussed above, the beginning of the line can be indicated using the beacon 20. Also, as partially discussed above, the drone can be in communication with the base station 21 for checking credentials of the people in the line with respect to a purpose for forming the line. For example, it is understood that a credential can be any documentation from a person meeting a threshold criteria for entry, or acceptance, etc., based on the purpose of the line. For example, an airline ticket or boarding pass for boarding a flight. The base station is envisioned as having a database 26 of data regarding the required credential, and a comparison can be made and the credential verified.

The method further includes detecting a person in the line of people, or a first person in the line, at block 108. The detecting of a person by the drone can include a visual device such as a camera on the drone. Such visual identification can be accomplished using, for example, a camera for taking photos or photographing, or filming, of credentials, or documentation presented by a person to analyze the information captured for verification of the credential. In another example, facial recognition can also be used for a verification of identification, and verifying when a person is in the correct line, for example, by checking if the person verified by facial recognition is expected at the check-in point or check point. In another example, wireless technology (or NFC (near-field communication)) can be used to communicate a scanned bar code or a picture of the credential to the drone.

Once the drone detects a person or first person in the line, the drone can proceed to request information from the person, as in block 112. The request for information can include the drone identifying itself, for example, by voice simulation, displaying a text, or messaging a text to a user device, that the drone is assisting in identifying data or credentials regarding the person and the line. For example, the drone can request identification or a credential, such as a boarding pass, from a person waiting in a line for check-in or boarding an aircraft. In response to the drone requesting information and the person providing the requested information, the method proceeds to block 116.

The drone can then proceed to capture information about the person, as in block 116. Capturing information can include the drone identifying itself to the person, for example, using a simulated voice, a text to the person's device, or a text display on the drone. In response to the drone requesting information and the person providing the requested information, the drone captures the information. The information is envisioned to be provided by the person upon request by the drone, voluntarily by the person, or on a voluntary basis, for the purpose of facilitating their check-in and reducing their wait time. Similarly, the drone can request the information, for example, using a simulated voice, a text to the person's device, or a text display on the drone, specifying what credential or documents are being requested form the person on the line.

Further, the drone can request information or the identifying of the person in the line can include at least in part using a verbal command menu initiated by the drone, or a telephone line or a voice line to an administrator at the base station for verbal communications with the person in the line by the administrator at the base station. In another example, the administrator can be at a check point in the venue of the line, and thus communicate with a person on the line in advance of reaching the front of the line at the check point.

The information can be uploaded or scanned by the drone to a computer in the drone, or a remote computer 22 at the base station 21, as in block 116. In an alternative embodiment, the information can be viewed using a camera in the drone, but not scanned or uploaded, and the method can proceed to the next step. The information provided by the person in the line and captured using the drone can be readied or prepared for viewing by an administrator or authority, and approved or verified, and not stored.

The method includes checking the information with data, at least in part, stored at the base station to verify the person's information with respect to credentials being related to the purpose of the line, as in block 120. The information from the person can include any credential needed for verification related to the purpose of the line. For example, which is not intended to be limiting, a person can be standing in a line at an airport for check-in for a flight. The information can be a boarding pass and/or a driver's license (or another type or kind of ID (Identification)) for verifying the person is in the correct line and for identification as credentials. Such example credentials are samples of information about the person or persons in a line. The credentials may be required for verification that the person is in the correct line, or for the person to move past a check point, or for entry into a venue or area, and/or for identification.

In another example, the drone can be informed of the start of a line at a beacon, or registration desk, or check-in point, for example for last names starting with A-C, or for First Class Passengers. The methods and system of the present disclosure can be applied, for example, but not limited to, an airport, large venues such as amusement parks, sports stadiums, conference registration lines.

Verification or checking credentials can take place at the drone, using a computer in the drone, or at the base station, using the computer at the base station, or the information can be verified using a combination of the both. The information can be checked or verified with data, which at least in part, in stored at the base station computer or database to verify the person's information or credentials with respect to the purpose of the line and/or the credential which the administrator or system requires for the person to be checked-in, admitted, or advance to the next area, or enter the venue. Such checking-in or approval is related to the purpose of the line and check-in area, for example, such as checking in for a flight at an airport. It is understood that the system or administrator of the system or sub-system, or venue owner, who has set-up and necessitated the check-in desk, or area, requires the check-in point for, for example, crowd control, security, legal requirements, etc., and thus has necessitated a line to form for check-in.

The method, using the drone and data at the base station can verify the information or credential(s) of a person and communicate a status for the verification to the person, at block 124. Once the credential or information is verified, the method continues to notify the person of the verified information or that other documentation or credentials are needed, and/or that a person may be on the wrong line.

If the credential is verified at block 124, the method proceeds to block 128.

If the credential is not verified at block 124 the method proceed to block 132. The drone can request another (or new) credential at block 132. The new credential can be checked or verified as in block 120. If the new credential is verified, at block 136, the process can proceed to block 128. If the new credential is not verified, the process can proceed to block 140. The flow chart in FIG. 2 depicts a new credential, however, it is understood that the drone can ask for more credentials if the new credential is not verified, or the drone can request multiple documents or credentials.

A second message can be communicated to the person explain that the new credential was not verified, as in block 140. The second message can include, for example, that the credential is not adequate, or the person is not on the correct line, and may suggest another line or course of action, which can include, for example, a person to contact, or a number to call. The process then proceeds to block 144.

When the credential is verified at block 124, the process proceeds to communicate a message to the person on the line, at block 128. The message can include, for example, a communication or statement that the credential are approved or correct, the person is on the correct line. The credential can be uploaded to a verification authority, such as a check in employee at an airport line, or a front desk for checking in so that the credential is available. The method then proceeds to block 144.

Regarding communicating messages to the person on the line, the method includes communicating a message to the person on the line in response to checking the information or credential(s) for the person, whether the message is a first message or a second message as discussed above. The message being communicated can include, for example, communicating that the information or credential is verified, or the credential is approved, or the credential is correct for the line or that the credential is not correct for the line, and thus the person is not on the correct line. The message can be communicated, for example, but not limited to, a simulated voice, a message on a display of the drone, or a text message sent to a person's device.

In an alternative embodiment, the information can be viewed using a camera, the information can be verified without scanning or uploading, and a message can be communicated to the person on the line.

Figure 3:
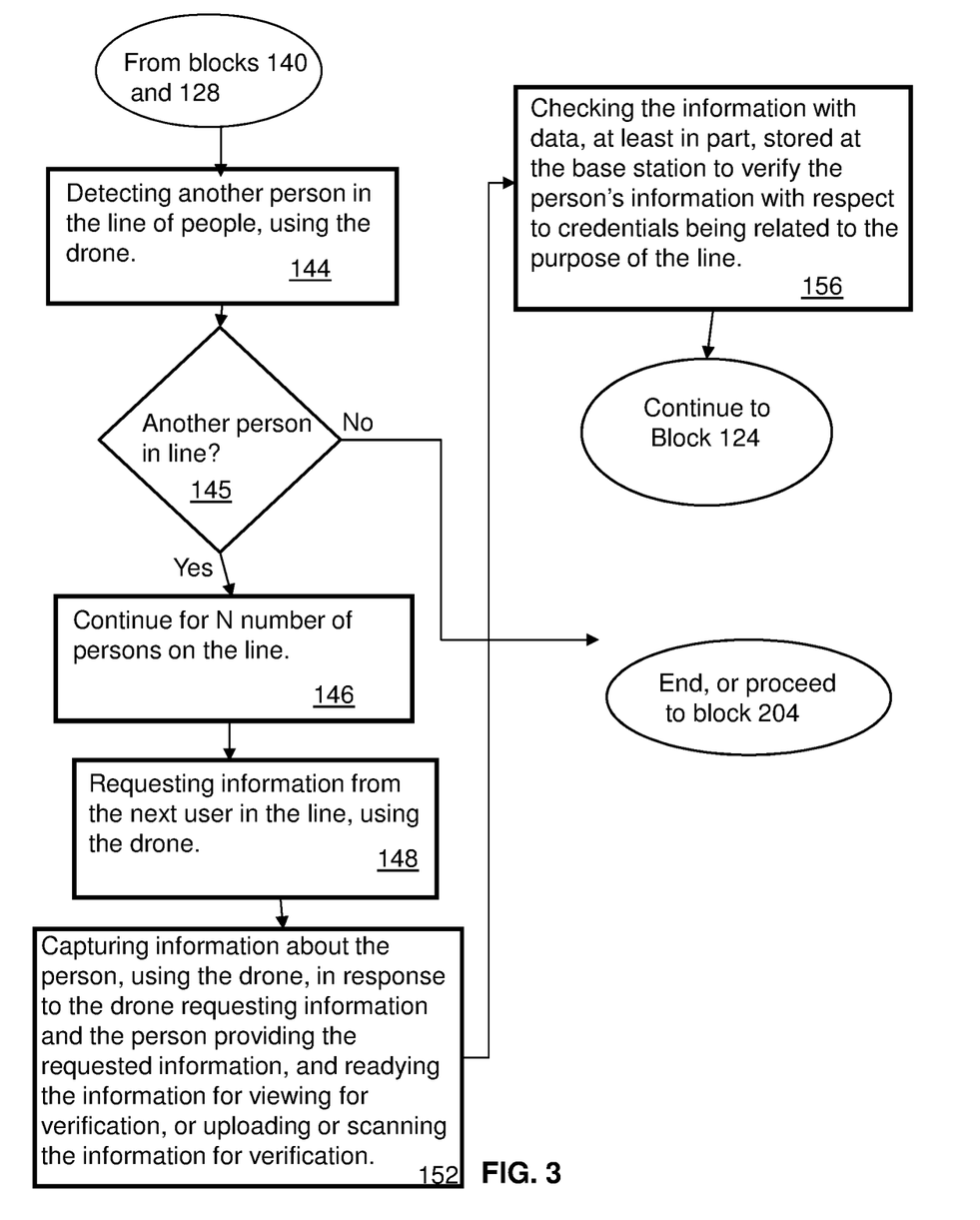
FIG. 3 is a flow chart illustrating a continuation of the method shown in FIG. 2, according to an embodiment of the disclosure.

Referring to FIG. 3, the flow chart continues from FIG. 2, the drone can be used to detect another person in the line of people, as in block 144. Another person can include a second person, third person, etc., for an N number of people in the line. Using visual detecting, for example, a camera in the drone, the drone can detect another person in the line. The drone can use a measurement of proximity to the first person in the line, and/or a proximity measurement from a beacon to determine another person on the line.

When another person is detected on the line, at block 145, the method continues for N number of people on the line, as in block 146. When another person is not detected on the line, at block 145, the method ends, or the method can proceed to an alternative method 200 at block 204 in FIG. 4, which option will be discussed below.

Once the drone detects another person in the line, the drone can proceed to request information from the person, as in block 148.

The information is provided by the person in the line and the captured information can be readied or prepared for viewing, or the information can be uploaded or scanned for verifying or checking, as in block 152 (and similarly to block 116 in FIG. 2). The verification can take place at the drone, using a computer in the drone, or at the base station, using the computer at the base station, or the information can be verified using a combination of the both. Referring to block 156, the information is checked or verified with data, which at least in part, in stored at the base station computer or database to verify the person's information or credentials with respect to the purpose of the line and/or the credential which the administrator or system requires for the person to be checked-in or advance to the next area, or enter the venue (similarly to block 120 in FIG. 2). Such checking-in or approval is related to the purpose of the line and check-in area, for example, such as checking in for a flight at an airport.

Once the credentials or information have been checked, the method continues to block 124 of FIG. 2.

Figure 4:
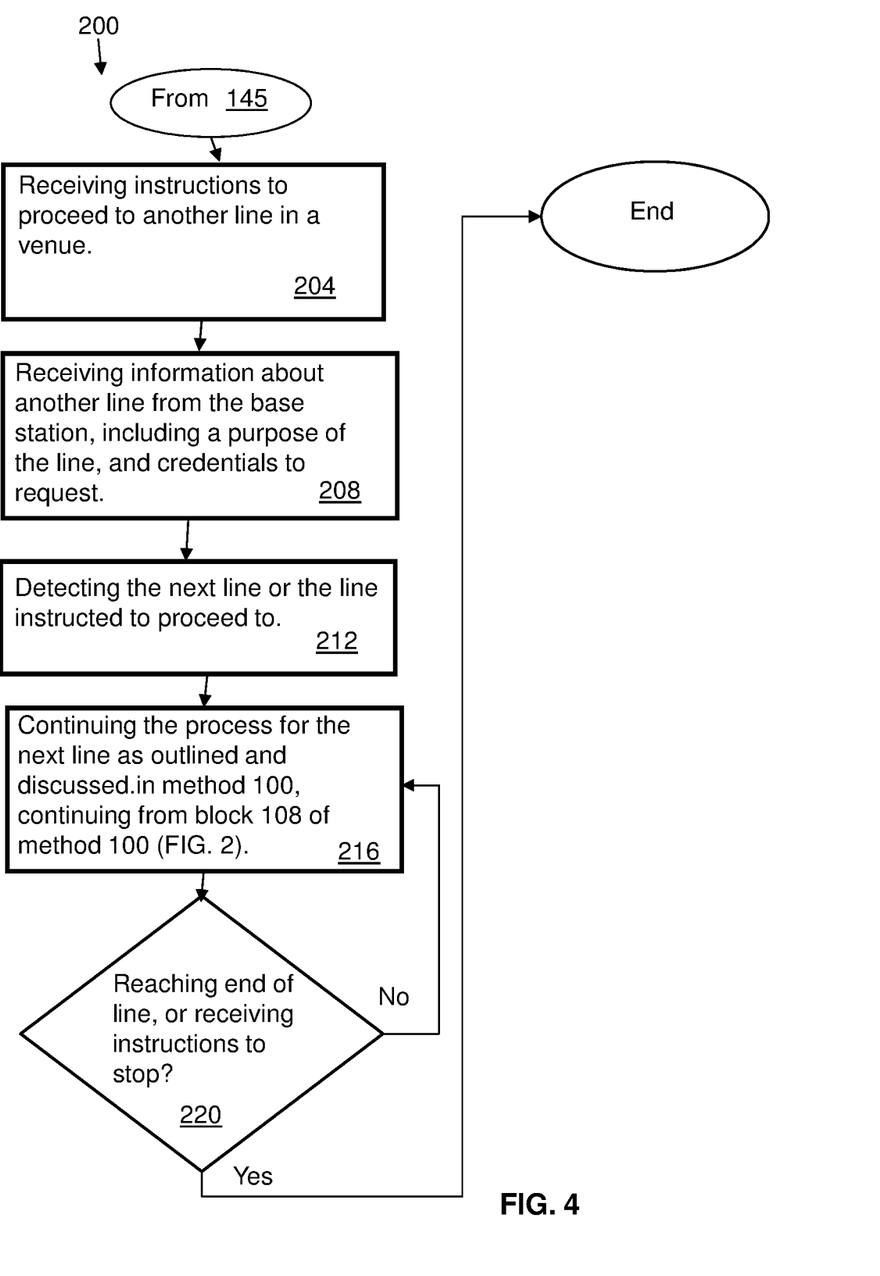
FIG. 4 is a flow chart illustrating another method which continues from the method of FIG. 3, for checking credentials, using a drone, of a person in a line of people, according to an embodiment of the disclosure.

Referring to FIG. 4, the alternative method 200 can continue from block 145 of the method 100 (FIG. 3), as an alternative to ending the method, when there is not another person in the line. In the method 200 the drone can be directed to another line by receiving instructions from the base station, to proceed to another line in a venue, as in block 204.

The drone can receive information about another line from the base station, including the purpose of the line, and credentials to request, as in block 208. The drone can then proceed to the next line or the line instructed to proceed to, as in block 212, The next line may be close to a previous line, or can be at a different location in the venue or at another venue.

The drone can continue the process as in block 216, as in the method 100, continuing at block 108 of the method 100 (FIG. 2), and continue to the end of the method 100, thereby reaching the end of a line, or receiving instructions to stop, as generalized in block 220 of FIG. 4.

The method 100 can include transmitting a message (e.g., a transmitting signal/message) using a short distance communication protocol using the beacon 20, as in block 128, to a device of a person in the line. In another example, a start zone area can be defined wherein any line starting in that area is automatically associated with a given purpose (e.g. a 20 ft×20 ft area in front of a check-in desk.

The message can include the purpose of the line, as a text message, and/or a symbol, or other indication of the purpose of the line. A message and the length of the message can vary. For example, at an airport, the message can read, for example, 'Line for Flight 100', or in another instance 'check-in line for domestic flights'. The message can also include a timestamp. The timestamp can include the time of arrival in the line of the device and thus the person, and the timestamp can identify the time the message was sent to the device.

Figure 5:
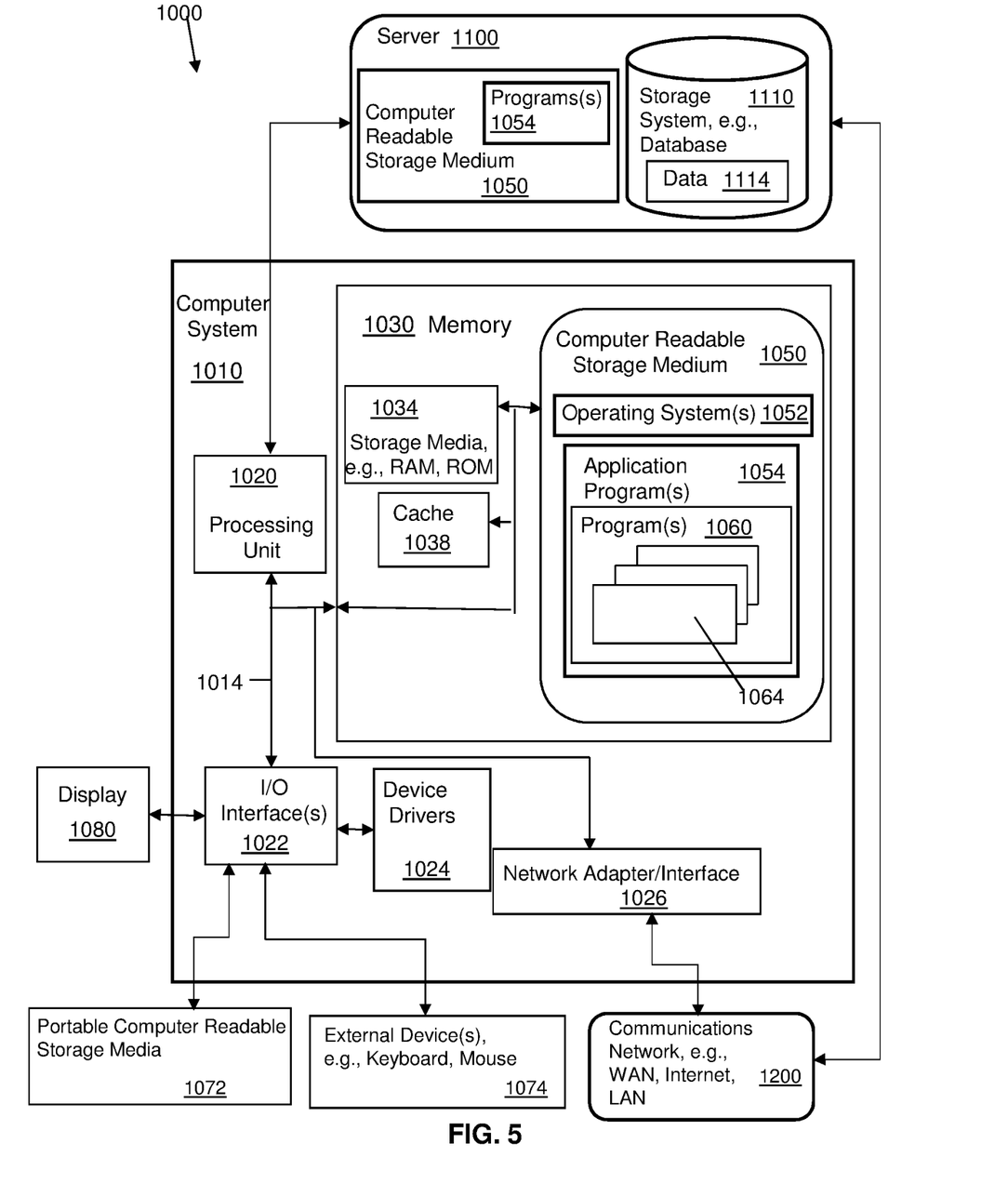
FIG. 5 is a schematic block diagram depicting a computer system according to an embodiment of the disclosure which may be incorporated, all or in part, in one or more computers or devices shown in FIG. 1, and cooperates with the system and methods shown in FIGS. 1, 2, 3, and 4.

The computer shown in FIG. 1, computer 22, and computers described in the present disclosure, which can be present, for example, in the beacon, or the drone, can be generically described in more detail, along with computer components, programs, and interactions, for example, servers, programs, and peripheral devices, with respect to the generic computer shown in FIG. 5 and described in the present disclosure.

Thereby, the present disclosure as discussed in the embodiments and examples herein, provides embodiments and example for managing people more effectively while in a physical waiting line using an aerial UAV (unmanned aerial vehicle)/drone. Various inspection or checking techniques can be used to identify the credentials of parties or persons in a line or within each line. A person waiting on a line can have credential checked and thus receive confirmation that they are on the correct line before spending a large amount of time waiting on a line, and then finding out they are on the wrong line. The drone can initiate a procedure to send the user to the correct line and location. Sometimes people are standing in a wrong waiting line/queue and do not know it. In busy public areas (i.e. airports, train stations, conference registrations, etc. . . . ) there can be many different lines within a small area or the lines can become intertwined and a person might unknowingly be in the wrong line. Thus, the present disclosure provides saving in time and efficiency for time management. The present disclosure provides a method and system for confirming credentials of a person waiting on a line and thereby confirming that the person is on the correct line.

Example of Using a Zone

Referring to FIG. 1, in one embodiment according to the present disclosure, the drone cane requests information from people in a line or otherwise in a defined zone. The zone can be defined using geo-markers or a geo-fence enabled by RFID (radio frequency identification) technology or GPS (global position system) technology. The drone can request information from people in a line defined by a geo-fence or all people in an area defined by a geo-fence.

Additional Examples of Implementation

The method 100, can include, at least in part, embodying steps of the method in a computer program stored in the drone, or, parts of the method embodied in a computer program can be stored in a beacon, or a remote computer at a base station or all or in part on a remote server. The steps of the method, at least in part, can also be part of a computer program stored remotely (for example, in a cloud computing environment, or on a remote server), and transmitting to or controlling a beacon (or local beacon), or the drone. And in a further example, the method, at least in part, can be part of a program stored on a drone, or stored remotely and communicating with a drone. In another example, the beacon can be part of or incorporated into a drone, or the drone acts as the beacon. In an alternative, a program, at least in part embodying the method 100, can be part of a remote server communicating with the drone, using a communication network, for example, the Internet. In the presently described embodiment shown in FIG. 1, computer components, programs, and interactions of computers and devices are generically shown in FIG. 5 and described in the present disclosure.

The computer system in the system 10 and discussed herein, such as computer 22 in FIG. 1, or a remote server, can include all or part of a computer system 1000 and computer 1010 shown in FIG. 5, which discloses a generic computer system 1000 and computer 1010. It is understood that the above disclosed computers/computer systems and the computer 1010 are representative or illustrative of many alternative computer devices and are presented here as generic representations for the purposes of the embodiments of the present invention. In the embodiment discussed above, for illustrative purposes, the method of the present disclosure can be embodied in a computer program 1060 (FIG. 5) or a software application stored on the computer 1010. The computer 1010 can all or in part represent a computer, for example, the computer 22 in FIG. 1. The computer 22, in FIG. 1, is shown as a remote computer or server which can embody a program incorporating the method of the present disclosure, however, in other embodiment in accordance with the present disclosure, a computer program embodying the present method can be part of a computer system running locally in one or more of the illustrated components of the system 10 shown in FIG. 1 (as was discussed hereinabove). Further, a computer program embodying the present method can be cloud based or part of a cloud environment. In one embodiment such a cloud based system or environment can include all or part of the computer system 1000 (FIG. 5) and cloud based environment components shown in FIGS. 7 and 8. Alternative embodiments can include a computer program stored remotely (for example, on a remote server 1100 (FIG. 5)), and, for example, can be implemented as a service.

Referring to FIG. 5, a system or computer environment 1000 includes a computer system 1010 shown in the form of a generic computing device. The method 100, for example, may be embodied in a program 1060 embodied on a computer readable storage device, for example, generally referred to as memory 1030 and more specifically, computer readable storage medium 1050. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 shown in FIG. 5 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 5 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 5, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 100 (FIG. 2) (and methods shown in FIGS. 3 and 4), for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Figure 6:
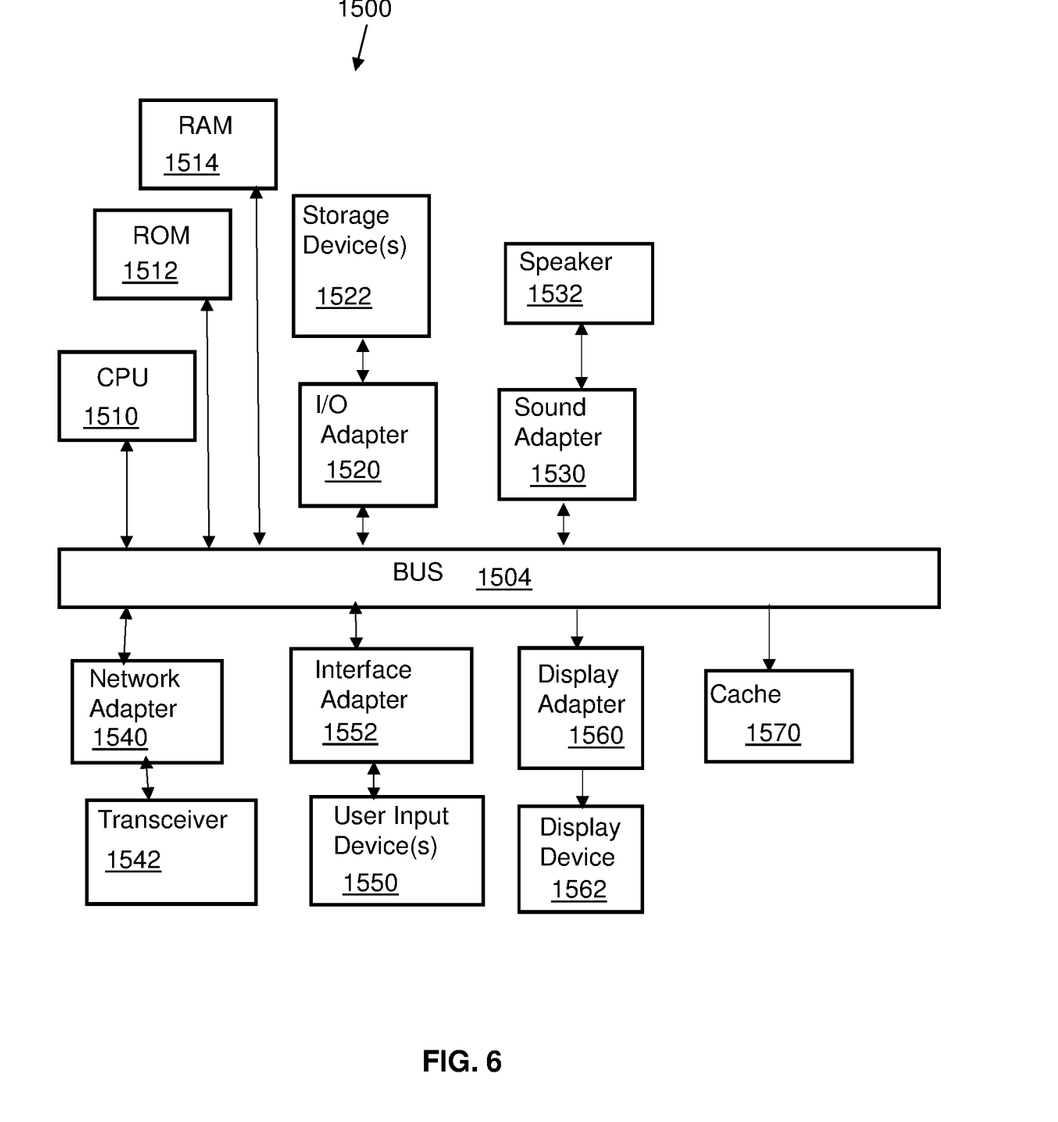
FIG. 6 is a schematic block diagram of a system depicting system components for use, all or in part, with the embodiments of the present disclosure, in accordance with one embodiment of the present disclosure.

Referring to FIG. 6, an example system 1500 for use with the embodiments of the present disclosure is depicted. The system 1500 includes a plurality of components and elements connected via a system bus 1504 (also referred to as a bus). At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. A speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

One or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
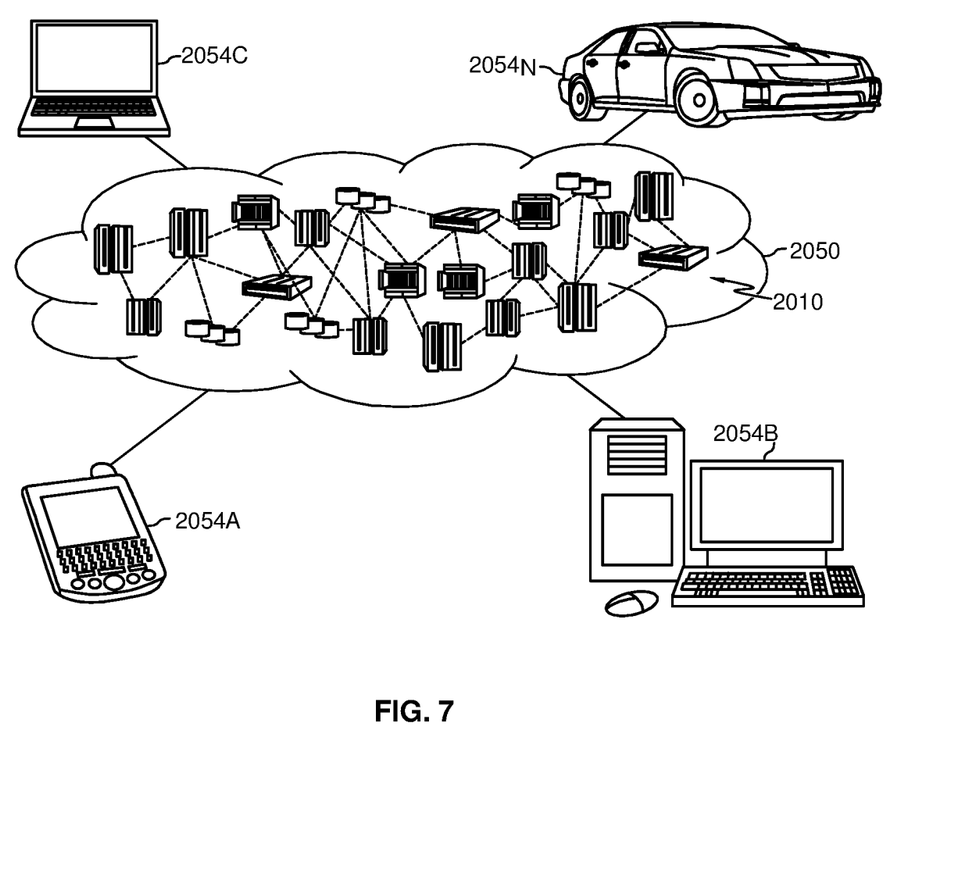
FIG. 7 is a block diagram depicting a cloud computing environment according to an embodiment of the present invention.

Referring now to FIG. 7, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 7 are intended to be illustrative only and that computing nodes 2010 and cloud computing environment 2050 can communicate with any type of computerized device over any type of network and/or network addressable connection (e.g., using a web browser).

Figure 8:
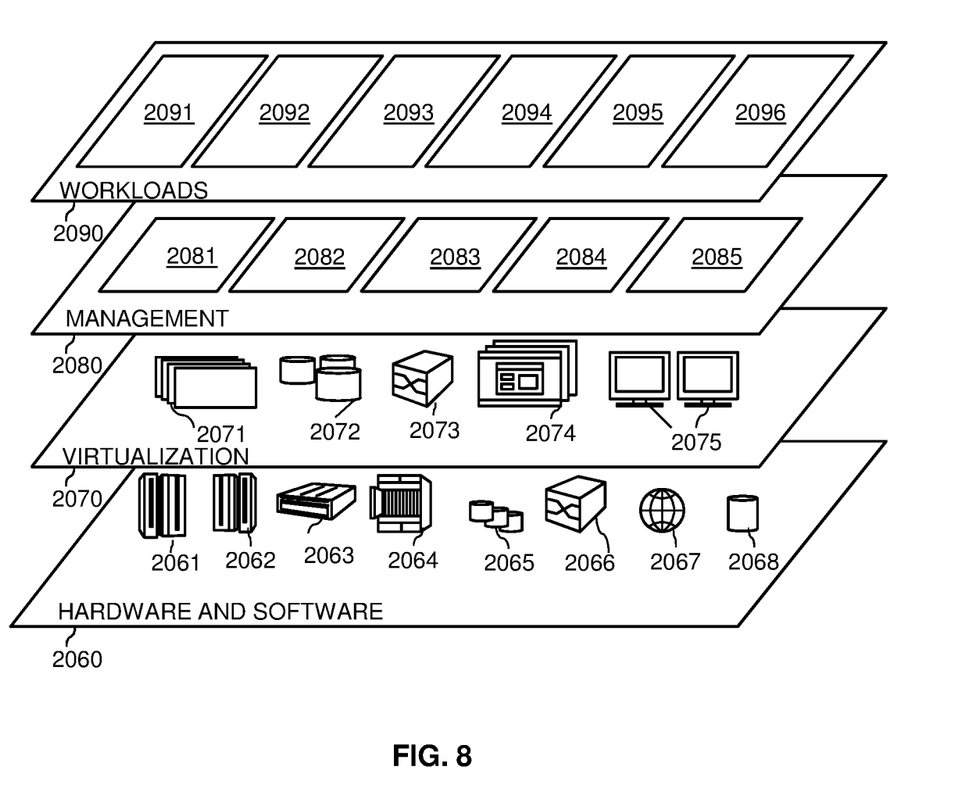
FIG. 8 is a block diagram depicting abstraction model layers according to an embodiment of the present invention.

Referring now to FIG. 8, a set of functional abstraction layers provided by cloud computing environment 2050 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and assessing or identifying the purpose and context of a line of people and communicating to user devices the purpose and context of the line 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for checking credentials, using a drone, comprising:
    detecting a line of people and a beginning of the line of people using a drone, the drone having a base station and being in communication with the base station for checking credentials of the people in the line with respect to a purpose for forming the line;
    the drone communicating with a device at a start point of the line to verify a start of the line;
    detecting, using the drone, a person in the line of people;
    capturing information about the person using the drone, in response to the drone requesting information from the person and the person providing the requested information;
    the drone communicating an identification of itself to the person, and requesting the information from the person in the line;
    the drone receiving the information provided by the person;
    checking the information with data, at least in part, stored at the base station to verify the person's information with respect to required credentials being related to the purpose of the line; and
    communicating a message, using the drone, to the person on the line, in response to the checking of the information of the person.

2. The method of claim 1, further comprising:
    communicating the purpose for the line to the drone from the base station, the purpose of the line being based, at least in part, on a location of the line.

3. The method of claim 1, further comprising:
    initiating a credential check for the person, using the drone, as part of the checking the information captured from the person.

4. The method of claim 3, further comprising:
    confirming the person has approved credentials based on the purpose of the line, using the drone, as part of the initiated credential check.

5. The method of claim 4, further comprising:
    communicating the confirmation of the approved credentials to the person as part of the communicated message to the person.

6. The method of claim 1, further comprising:
    determining the person is in a correct line, using the drone, based on the purpose of the line and the captured information.

7. The method of claim 1, wherein the drone communicates using an audible simulated voice, or displays a message for the person, or sends a message to a device of the person in the line.

8. The method of claim 7, wherein the drone communicates an identification of itself to the person, and requests a credential from the person in the line.

9. The method of claim 1, further comprising:
communicating the credentials of the person to a check point computer related to the purpose of the line, in response to the credentials being approved, and wherein the check point computer is at a beginning of the line for coordinating the line.

10. The method of claim 1, wherein the drone communicates with a beacon positioned at the beginning of the line to verify a start of the line.

11. The method of claim 10, further comprising:
communicating the purpose for the line to the drone using a beacon positioned at the beginning of the line.

12. The method of claim 1, further comprising:
communicating the purpose for the line to the drone, at least in part from data provided by the base station communicated to the drone, and the purpose of the line being based on, at least in part, a location of the line.

13. The method of claim 1, further comprising:
detecting a second person in the line of people, using the drone;
capturing information about the second person;
checking the information about the second person with data, at least in part, stored at the base station to verify the second person's information with respect to required credentials being related to the purpose of the line; and
communicating a message to the second person on the line.

14. The method of claim 1, further comprising:
iteratively detecting a plurality of people in the line of people, using the drone;
capturing information about each of the plurality of people;
checking the information about each of the people with data, at least in part, stored at the base station to verify each of the people's information with respect to required credentials for each of the people being related to the purpose of the line; and
communicating a message to each of the people on the line.

15. The method of claim 1, further comprising:
directing the person, using the drone, to another line, in response to determining that the person is not in the correct line, and/or does not have approved credentials based on the purpose of the line, and at least in part, data from the base station.

16. The method of claim 1, wherein the identifying of the person in the line includes at least in part, filming or photographing specified identification provided by the person in the line using a camera on the drone, and the specified identification being verified at least in part using data at a base station computer at the base station.

17. The method of claim 14, wherein the identifying of the person in the line includes at least in part using facial recognition using a camera on the drone.

18. The method of claim 14, wherein the identifying of the person in the line includes at least in part using a verbal command menu initiated by the drone, or a telephone line to an administrator at the base station from the drone, for verbal communications with the person.

19. A system for checking credentials, using a drone, the system comprising:
a computer system comprising: a computer processor, a computer-readable storage medium, and program instructions stored on the computer-readable storage medium being executable by the processor, to cause the computer system to:
detect a line of people and a beginning of the line of people using a drone, the drone having a base station and being in communication with the base station for checking credentials of the people in the line with respect to a purpose for forming the line;
the drone communicates with a device at a start point of the line to verify a start of the line;
detect, using the drone, a person in the line of people;
capture information about the person using the drone, in response to the drone requesting information from the person and the person providing the requested information;
the drone communicates an identification of itself to the person, and requests the information from the person in the line;
the drone receives the information provided by the person;
check the information with data, at least in part, stored at the base station to verify the person's information with respect to required credentials being related to the purpose of the line; and
communicate a message, using the drone, to the person on the line, in response to the checking of the information of the person.

20. A computer program product for checking credentials, using a drone, the computer program product comprising a computer readable storage medium having program instructions embodied therewith, wherein the computer readable storage medium is not a transitory signal per se, the program instructions executable by a computer to cause the computer to perform a method, comprising:
detecting a line of people and a beginning of the line of people using a drone, the drone having a base station and being in communication with the base station for checking credentials of the people in the line with respect to a purpose for forming the line;
the drone communicating with a device at a start point of the line to verify a start of the line;
detecting, using the drone, a person in the line of people;
capturing information about the person using the drone, in response to the drone requesting information from the person and the person providing the requested information;
the drone communicating an identification of itself to the person, and requesting the information from the person in the line;
the drone receiving the information provided by the person;
checking the information with data, at least in part, stored at the base station to verify the person's information with respect to required credentials being related to the purpose of the line; and
communicating a message, using the drone, to the person on the line, in response to the checking of the information of the person.

* * * * *